(12) United States Patent
Ogura

(10) Patent No.: US 7,349,562 B2
(45) Date of Patent: Mar. 25, 2008

(54) FINGERPRINT INPUT APPARATUS AND PERSONAL AUTHENTICATION SYSTEM

(75) Inventor: Makoto Ogura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 701 days.

(21) Appl. No.: 10/874,366

(22) Filed: Jun. 24, 2004

(65) Prior Publication Data

US 2005/0008202 A1    Jan. 13, 2005

(30) Foreign Application Priority Data

Jun. 27, 2003    (JP)    ............................. 2003-185014

(51) Int. Cl.
*G06K 9/00* (2006.01)
(52) U.S. Cl. .................... 382/124; 250/556; 356/71
(58) Field of Classification Search ................ 382/115, 382/100, 124, 127; 600/300, 301; 709/204; 235/379; 348/14.08, E7.081; 128/920, 925; 715/784, 839; 356/71; 250/556
See application file for complete search history.

(56) References Cited

U.S. PATENT DOCUMENTS

| | | | |
|---|---|---|---|
| 5,177,802 A | 1/1993 | Fujimoto et al. | |
| 5,446,290 A | 8/1995 | Fujieda et al. | |
| 5,708,497 A | 1/1998 | Fujieda | |
| 6,128,399 A | 10/2000 | Calmel | |
| 6,259,108 B1 | 7/2001 | Antonelli et al. | |
| 6,355,937 B2 | 3/2002 | Antonelli et al. | |
| 6,566,685 B2* | 5/2003 | Morikawa et al. | ............. 257/59 |
| 6,575,902 B1* | 6/2003 | Burton | ........................ 600/300 |
| 6,657,614 B1* | 12/2003 | Ito et al. | ...................... 345/168 |
| 6,927,844 B2* | 8/2005 | Higuchi et al. | ................ 356/71 |
| 2001/0030324 A1* | 10/2001 | Morikawa et al. | ............ 257/59 |
| 2002/0005906 A1 | 1/2002 | Ohkubo et al. | |
| 2003/0103686 A1 | 6/2003 | Ogura | |
| 2003/0118219 A1 | 6/2003 | Higuchi et al. | |
| 2003/0156744 A1* | 8/2003 | Hashimoto | ................... 382/124 |

FOREIGN PATENT DOCUMENTS

JP    2000-11142    1/2000

(Continued)

*Primary Examiner*—Sheela Chawan
(74) *Attorney, Agent, or Firm*—Fitzpatrick, Cella, Harper & Scinto

(57) ABSTRACT

The invention provides a fingerprint input apparatus capable of more stably providing an image "of a higher definition than in prior technologies. The fingerprint input apparatus includes an LED chip 10 and a solid image pickup device substrate 1 adapted to irradiate a finger 20 of a fingerprint inputting person with & light from the LED 10 and bearing a solid image pickup device for receiving light scattered in the interior of the finger, and reads the fingerprint of the finger 20 based on a light reception signal of the solid image pickup device. The solid image pickup device is constituted of a one-dimensional or two-dimensional image pickup device formed on a rectangular solid image pickup device substrate. A rectangular protective member 30 is adhered to a side, to be contacted by the finger 20, of the solid image pickup device substrate 1. In the protective member 30, among four sides L1, L2, W1 and W2 constituting a rectangular external shape, two longer sides L1 and L2 and a shorter side W1 have the same shape as the external, shape of the solid image pickup device substrate 1.

7 Claims, 7 Drawing Sheets

FOREIGN PATENT DOCUMENTS

| | | |
|---|---|---|
| JP | 2000-217803 A | 8/2000 |
| JP | 2001-92951 | 4/2001 |
| JP | 2002-133402 A | 5/2002 |
| JP | 2002-216116 A | 8/2002 |
| JP | 2003-142616 | 5/2003 |

* cited by examiner

FINGERPRINT INPUT APPARATUS AND PERSONAL AUTHENTICATION SYSTEM

BACKGROUND OF THE INVENTION

1. Field of the Invention

The present invention relates to a fingerprint input apparatus for irradiating a finger with light from illumination source and receiving the light scattered from the interior of the finger with a solid image pickup device.

2. Related Background Art

With the increasing pervasiveness of economic activities such as electronic trading based on the recent remarkable progress in the information technology, necessity for electronic personal authentication of is also increasing for the purpose of avoiding illegal use of the information.

For electronic personal authentication, there has frequently been employed a method inputting a fingerprint image. However, a system utilizing a total, reflecting prism, as disclosed in Japanese Patent Application Laid-open No. 2000-11142, is associated with drawbacks of becoming large in the shape, and being unable to identify a fingerprint formed for example by molding with a resin.

As a compact and highly reliable fingerprint input apparatus capable of solving theses drawbacks, Japanese Patent Application Laid-open No. 2000-217803 proposes a method of irradiating a finger, maintained in contact with the vicinity of a surface of a two-dimensional solid image pickup element, with a near infrared light and receiving a scattered light from the interior of the finger. This method will be explained with reference to FIG. 10.

In a fingerprint input apparatus shown in FIG. 10, on a surface of a solid image pickup device substrate 1, solid image pickup elements 1a are formed two dimensionally with a predetermined pitch p, on which a cover glass 100 is fixed with a transparent sealing material 41. The solid image pickup device substrate 1 is fixed on a wiring board 3, also is electrically connected by a wire 21 with a wiring 3a on the wiring board 3 and is protected by a sealing resin 41. Also an illuminating LED chip 10 is connected by a wire 12 with the wiring 3a on the wiring board 3 and is protected by the sealing resin 11. A light 10a emitted from the LED chip 10 enters a finger 20, is diffused therein and enters from a fingerprint 20a into the cover glass 100 as a diffuse light 10b. Such entering light arrives, through the cover glass 100, at the solid image pickup element 1a and is photoelectrically converted therein, whereby an electrical signal of a fingerprint image can be obtained. For the LED chip 10, there can be utilized an infrared light, a near infrared light or a red light, but another wavelength region is also utilizable.

The cover glass 100 is required to have an optical filter function, for the purpose of protection from electrical or mechanical destruction of the solid image pickup element 1a caused by a contact of the finger 20 or the like therewith and for eliminating a perturbing light other than the fingerprint image. However, in order to obtain a sharp fingerprint image, the cover glass 100 is required to have an extremely small thickness t, and, for avoiding such situation, it has been necessary to use an expensive material such as a fiber optics plate (FOP).

On the other hand, for attaining a low cost and a compact structure, there is proposed a sweeping technology of moving a finger tip relative to the solid image pickup device and synthesizing continuous plural partial images of such moving finger tip to obtain an image of the entire finger tip (for example Japanese Patent Application Laid-open Nos. 2002-216116 and 2002-133402). In this technology, the two-dimensional array of the solid image pickup elements, which has to be of an area of about the size of the finger, can be reduced to a size only covering the width of the finger, whereby the solid image pickup device and the fiber optical plate can be made inexpensive. In such sweep type, in addition to the optical system explained above, there are also known an electrostatic capacitance system and a thermal detection system.

However, the prior technologies explained in the foregoing is associated with following difficulties in attaining a compact structure and a low cost.

1) In the optical system, since a thickness and unevenness in the adhesion between the protective member and the solid image pickup device affects the sharpness of the image, an unstable adhering method has deteriorated the production yield.
2) Also in adhering the protective member to the solid image pickup device, an adhesive resin is coated in a somewhat excessive amount and the protective member is pressed in order that no bubbles remain in the adhesive and that the adhesive is spread over the entire area. Therefore, at the adhering operation, the adhesive material overflows on the protective member to require a corrective operation such as a wiping operation after the adhesion, thereby lowering the production efficiency.
3) As a chipping of an edge portion of the protective member leads to a crack formation, the protective member has to be cut and handled in stable manner. Particularly in case of a thin protective member, as small pieces have been mounted one by one, such handling has resulted in chipping or cracking.
4) When the protective member is pressed, dusts or foreign substances are incorporated thereunder to cause a damage in the solid image pickup device substrate or a cracking of the protective member, so that an adhering operation in a condition as dust free as possible is desired.
5) As antistatic means is provided in a member of the main body, there result a limitation in the designing and of the main body and a fluctuation resulting from assembling.

In the conventional methods, sufficient countermeasures have not been made against such difficulties 1) to 5). Also the aforementioned prior technologies do not describe any definite countermeasures or are not satisfactory.

SUMMARY OF THE INVENTION

The present invention has been made to resolve such drawbacks, and is to easily and inexpensively provide a fingerprint input apparatus capable of obtaining an image that is stabler and more definite than in the prior technologies.

The aforementioned object can be attained, according to the present invention, by a fingerprint input apparatus including illumination means for irradiating a finger with a light therefrom, and a solid image pickup device unit for receiving, among such light, a light portion scattered from the interior of the finger to read a fingerprint image of the finger based on a light reception signal of the solid image pickup device unit, the apparatus being characterized in that the solid image pickup device unit is constituted of one-dimensional or two-dimensional image pickup elements formed on a solid image pickup device substrate, that a protective member is fixed on a side of the solid image pickup device substrate coming into contact with the finger and that the protective member has, at least in a part thereof, a portion having the same shape as an external shape of the solid image pickup device substrate.

It is preferred that both the solid image pickup device substrate and the protective member have a rectangular shape and that at least two sides of the protective member, among four sides constituting the rectangular external shape, have the same shape as the external shape of the solid image pickup device substrate.

The solid image pickup device substrate is formed into an oblong shape, and the aforementioned at least two sides can be longer sides of such oblong external shape.

The solid image pickup device unit may be formed with a rectangular external shape of a predetermined dimension, and may collectively read the fingerprint image of the finger, placed on the surface of the protective member, by the solid image pickup device unit. The solid image pickup device unit may preferably be a square having a side of about 10 to 20 mm.

Also the solid image pickup device unit may be formed with a rectangular external shape with predetermined width and length, for reading the fingerprint image of the finger while the finger placed on the surface of the protective member is made to slide along a predetermined direction. The solid image pickup device unit preferably has a width of about 10 to 20 mm and a length of about several millimeters.

The illumination means preferably has a light source emitting an infrared light and/or a near infrared light.

The protective member may be a silicon substrate of a predetermined thickness. The thickness of the silicon substrate is preferably 30 to 200 μm.

The protective member may have electroconductive means.

The present invention also provides a method for producing any of the fingerprint input apparatus described above, and is characterized in including a step of adhering an assembly of the solid image pickup device units and an assembly of the protective members, and a step of dividing the adhered assemblies into individual units.

Also the present invention provides a personal authentication system characterized in utilizing any of the fingerprint input apparatus described above. The personal authentication system may further include fingerprint registration means which registers the fingerprint of the finger, read by the fingerprint input apparatus, in advance as identification information, and fingerprint verification means which verifies whether the fingerprint image of the finger read by the fingerprint input apparatus matches the registered image in the fingerprint registration means and outputs a result of verification as a personal authentication signal.

Thus the present invention can easily and inexpensively provide a fingerprint input apparatus capable of providing a stabler image of a higher definition than in the prior technologies.

DETAILED DESCRIPTION OF THE PREFERRED EMBODIMENTS

In the following, embodiments of the present invention will be explained with reference to accompanying drawings.

First Embodiment

Figure 1:
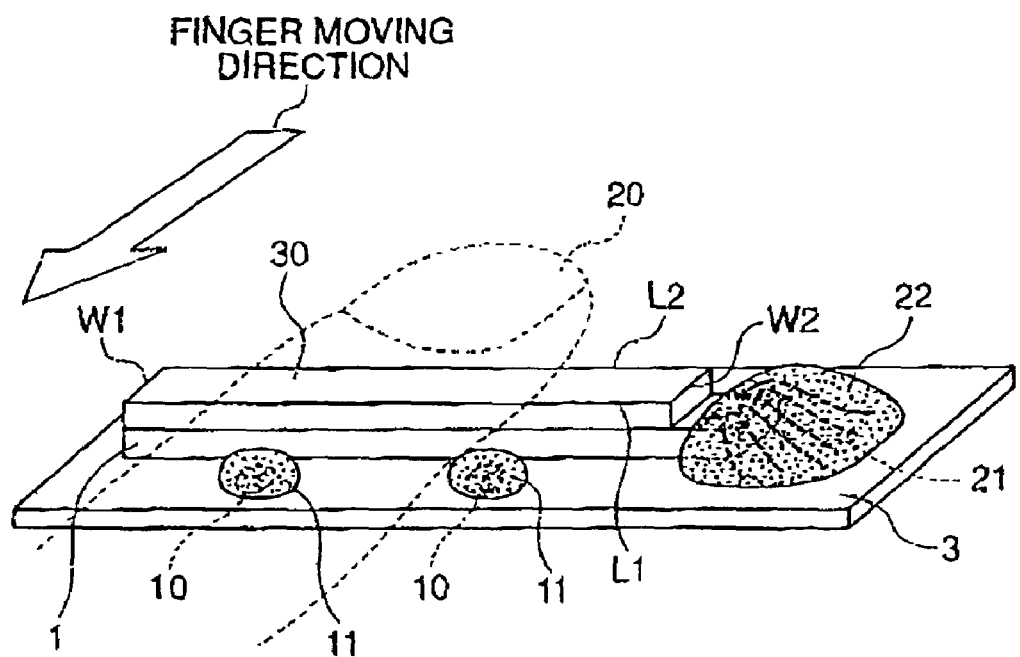
FIG. 1 is a perspective view of a fingerprint input apparatus in a first embodiment of the present invention.
Figure 2:
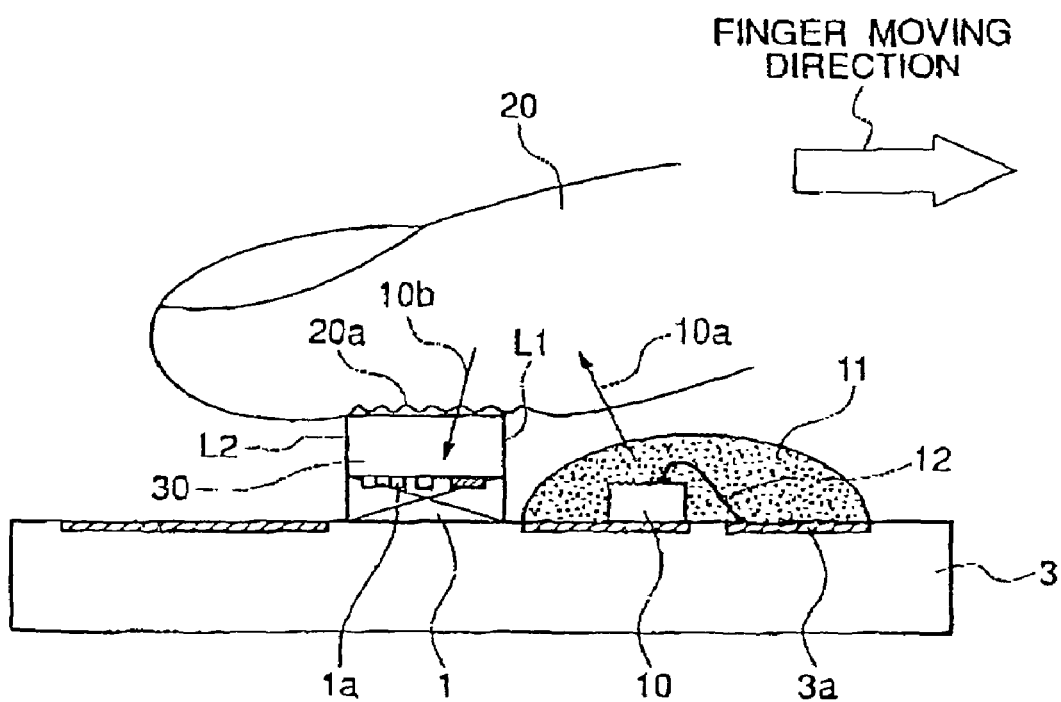
FIG. 2 is a cross-sectional view of a fingerprint input apparatus in a first embodiment of the present invention.
Figure 3:
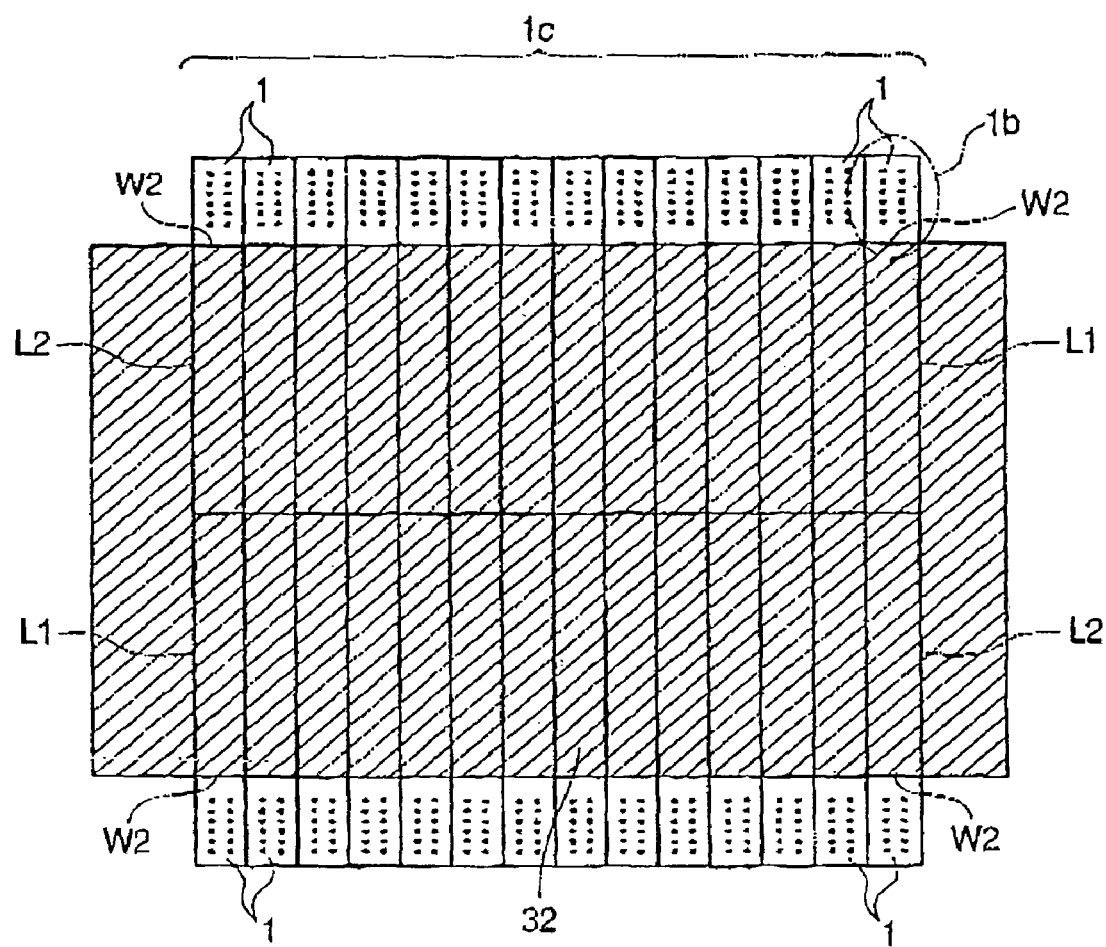
FIG. 3 is a schematic view showing a producing method for a fingerprint input apparatus in a first embodiment of the present invention.

FIG. 1 is a perspective view of a fingerprint input apparatus of the present embodiment, FIG. 2 is a cross-sectional view of such fingerprint input apparatus, and FIG. 3 is a schematic view showing a producing method for the fingerprint input apparatus. The present embodiment is applied to a fingerprint input apparatus of sweep type, in which a finger of a fingerprint inputting person is moved relative to the solid image pickup device and continuous plural partial images of the moving finger tip are collected and synthesized to obtain an image of an entire finger tip.

In the fingerprint input apparatus shown in FIGS. 1 to 3, on a wiring board 3 bearing a wiring portion, a solid image pickup device substrate 1 of a rectangular external shape and an LED chip 10 constituting illumination means for emitting an infrared light and/or a near infrared light are provided in predetermined positions. On the solid image pickup device substrate 1, an shown in FIG. 2, there are provided plural units of a linearly arrayed solid image pickup elements (one-dimensional image pickup device) 1a. In the example shown in FIG. 1, the LED chip 10 in two positions, on the wiring board 3, opposed to a lateral side in the longitudinal direction of the solid image pickup device substrate 1. Number and position of the LED chip 10 are not limited to those explained above and can be suitably modified.

In the solid image pickup device substrate 1, as shown in FIGS. 1 and 3, an electrode portion formed in a bonding pad 1b provided at a longitudinal end thereof is electrically connected by a wire 21 with a wiring 3a on the wiring board 3, and a sealing resin 22 is coated in a predetermined position for protecting the wire 21.

In the LED chip 10, as shown in FIG. 2, an electrode portion thereof is electrically connected by a wire 12 with a wiring 3a on the wiring board 3, and a sealing resin 11 is coated in a predetermined position for protecting the wire 12.

In the solid image pickup device substrate 1, a surface thereof to be contacted by the finger of the fingerprint inputting person constitutes a reading surface for reading the image of the fingerprint 20a, and a protective member 30 is provided on such reading surface.

As the protective member 30, there can be employed a glass or a fiber optics plate (FOP). In order to achieve a still lower cost and to read a fine image, the protective member 30 is required to satisfy conditions (1) to have a high refractive index in order to suppress spreading of light between the entrance end to the exit end in consideration of light leakage (crosstalk) to the adjacent solid image pickup element, (2) to prevent entry of light other than the illuminating light for obtaining a sharp image, (3) to have a scratch resistance and a weather resistance as a protective member, (4) to be inexpensive, (5) to be easily workable, and (6) to have a linear expansion coefficient close to that of the solid image pickup device substrate in consideration of bending or deformation.

Therefore, as the protective member 30 of the present embodiment, there is particularly advantageously employed a silicon substrate. A silicon substrate, which can be worked to a desired thickness by back grinding or back lapping, and can transmit infrared and near infrared lights while intercepting visible light, can provide a resolving power equivalent to that of glass even at a thickness of 1.5 to 2 times. In case of employing a silicon substrate as the protective member 30, there can be employed a thickness of 30 to 200 µm. There is particularly preferred a thickness of 70 to 150 µm. Such silicon substrate is fixed as the protective member 30, by an adhesive material capable of transmitting infrared/near infrared light, onto the solid image pickup device 1a of the solid image pickup device substrate 1.

In the protective member 30 of the present embodiment, as shown in FIGS. 1 and 2, among four peripheral sides constituting the rectangular external shape (hereinafter two longer sides being referred to as a first longer side L1 and a second longer side L2, and two shorter sides being referred to as a first shorter side W and a second shorter side W2), the first longer side L1, the second longer side L2 and the first shorter side W1 are so constructed as to be coplanar respectively with two longer sides and a shorter side within the peripheral four sides constituting the rectangular external shape of the solid image pickup device substrate 1.

This is because, particularly when a silicon substrate or a thin glass plate is used as the protective member 30, and in case such protective member is eventually larger than the solid image pickup device substrate 1, such larger portion is apt to be touched or pressed by the finger and to generate a crack, while, in case such protective member 30 is smaller than the solid image pickup device substrate 1, it cannot exhibit the function as the protective member and the solid image pickup device substrate 1 may be damaged for example by the finger.

In the following, there will be explained a method for producing the fingerprint input apparatus of the present embodiment, with reference to FIG. 3.

At first an assembly 1c formed by an array of plural solid image pickup device substrates 1 in a predetermined direction and a silicon sheet 32 of a thickness of 100 µm as an assembly of the protective members 30 are adhered collectively. In the example shown in FIG. 3, the assembly 1c is constituted of 28 solid image pickup device substrates 1 arranged by 2 rows in the vertical (longitudinal) direction and by 14 rows in the horizontal (transversal) direction, but the number and the mode of array are not limited to the foregoing and can be suitably modified.

In the present embodiment, the bonding pads 1b of the solid image pickup device substrates 1 constituting the assembly 1c are positioned, as shown in FIG. 3, in opposed external ends in the longitudinal direction of two rows mutually adjacent in the vertical direction, and the silicon sheet 32 is adhered onto the solid image pickup device substrates 2 positioned between both bonding pads 1b, 1b. In this operation, the bonding pads 1b of the solid image pickup device substrates 1 are preferably protected with a masking tape or the like in order that the adhesive resin is not deposited.

After the adhesive is hardened, the assembly of the solid image pickup device substrates 1 and the silicon sheet 32 are simultaneously cut by dicing into individual units. In this manner, the protective member 30 is so formed that the first longer side L1, the second longer side L2 and the first shorter side W1 thereof are respectively co-planar with the external shape of the solid image pickup device substrate 1, and such structure is mounted on the wiring board 3 to provide a fingerprint input apparatus of the configuration shown in FIGS. 1 and 2.

The aforementioned producing method provides following effects, in comparison with a method of adhering a small piece individually to a solid image pickup device substrate 1.

1) The protective members 30, constituted for example of easily crackable glass or silicon substrate, can be collectively handled, thereby achieving easier handling, easier automation and a higher productivity in comparison with the case of individual adhering. Also the thickness of adhesive is thus stabilized, thereby improving the sharpness of the image.

2) As the cut face is co-planar with that of the solid image pickup device substrate 1, there can be avoided fears of crack formation in case of a large size or a damage to the solid image pickup device substrate 1 in case of small size.

3) Leakage of the adhesive from the protective member 30 need only be avoided in the bonding pad 1b, whereby the productivity can be improved.

4) Since the work is done on a wafer itself or in a state close thereto, the operation can be executed in a clean room where the dust level is low. Also since the protective member 30 such as a thin glass or a silicon substrate is cut together with the solid image pickup device substrate 1, a chipping or a cracking caused by vibration at the cutting operation can be significantly decreased in comparison with a case of individual cutting in a thin state.

5) The cutting together with the solid image pickup device substrate 1 improves precision of the external shape and the position of the protective member 30.

6) Decrease in the number of total process steps allows to achieve a lower cost.

Second Embodiment

Figure 4:
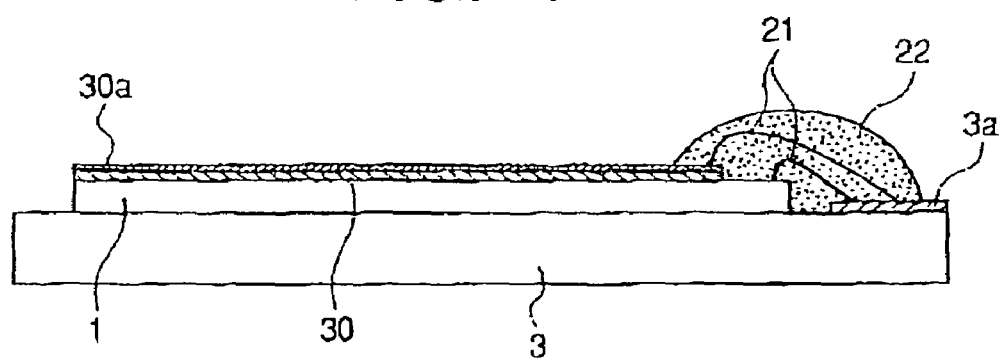
FIG. 4 is a cross-sectional view of a fingerprint input apparatus in a second embodiment of the present invention.

FIG. 4 is a cross-sectional view of a fingerprint input apparatus of the present embodiment.

In the fingerprint input apparatus shown in FIG. 4, on the surface of a protective member 30 provided on a solid image pickup device substrate 1 fixed on a wiring board 3, there is further formed an electroconductive layer 30a such as of ITO or a metal film, which is connected by a wire 21 to a predetermined electrode in a wiring portion 3a on the wiring board 3.

Such configuration allows to obtain, in addition to the effects similar to those in the foregoing first embodiment, antistatic and noise-shielding effects. This fingerprint input apparatus can be prepared by a method similar to that of the first embodiment.

Third Embodiment

Figure 5:
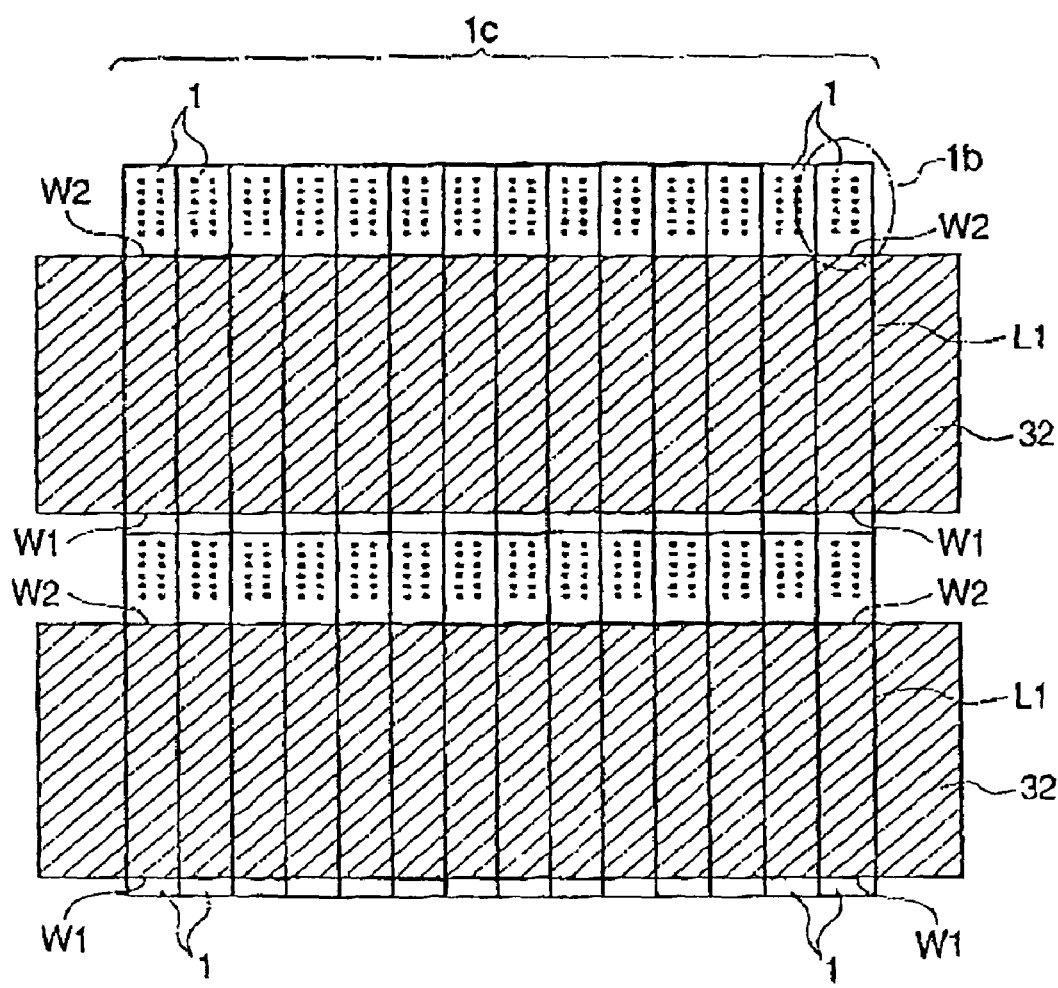
FIG. 5 is a schematic view showing a producing method for a fingerprint input apparatus in a third embodiment of the present invention.

FIG. 5 shows a method for producing a fingerprint input apparatus of the present embodiment.

In the producing method for the fingerprint input apparatus shown in FIG. 5, there is prepared an assembly 1c in which plural solid image pickup device substrates 1 are arranged along a same direction. In the example shown in FIG. 5, as in the example shown in FIG. 3, the assembly 1c is constituted of 28 solid image pickup device substrates 1 arranged by 2 rows in the vertical direction and by 14 rows in the horizontal direction, but the number end the mode of array are not limited to the foregoing and can be suitably modified. Two silicon sheets 32, 32, as assemblies of the protective members 30, are collectively adhered as in the first embodiment, respectively two rows of the solid image pickup device substrates 1, 1 which are mutually adjacent in the vertical direction on the assembly 1c.

In this case, the first longer side L1 and the second longer side L2 constituting two longer sides of the protective member 30 become respectively co-planar with the external shape of the solid image pickup device substrate 1. More specifically, in contrast to the foregoing first embodiment, the shorter side W1 of the protective member 30 is not co-planar with the external shape of the solid image pickup device substrate 1. This area, positioned opposite to the bonding pad 1b of the solid image pickup device substrate 1, is not contacted by the finger even without the protective member 30. The bonding pad 1b is masked to avoid the overflowing adhesive, as in the first embodiment. Therefore effects similar to those in the foregoing first embodiment can be expected also in the present embodiment.

Fourth Embodiment

Figure 6:
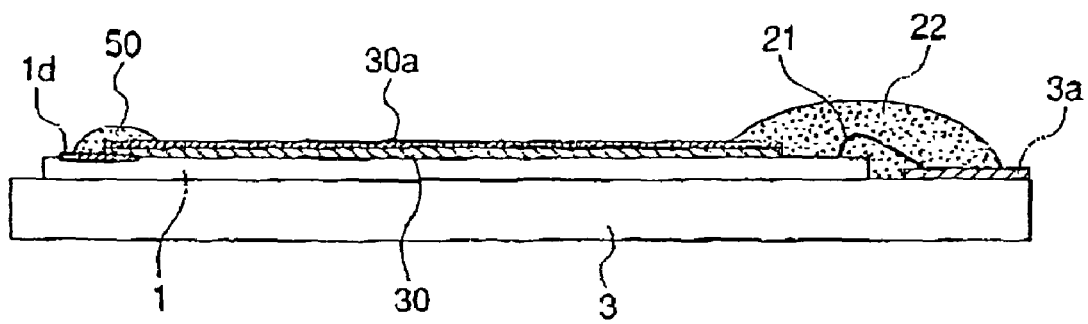
FIG. 6 is a cross-sectional view of a fingerprint input apparatus in a fourth embodiment of the present invention.

FIG. 6 is a cross-sectional view of a fingerprint input apparatus of the present embodiment.

In the fingerprint input apparatus shown in FIG. 6, the adhesion of the protective member 30 onto the solid image pickup device substrate 1 can be executed in the same manner as in the aforementioned third embodiment shown in FIG. 5. Referring to FIG. 5, a conductive layer 30a on the protective member 30 is electrically connected with a wiring pattern 1d formed on the solid image pickup device substrate 1 by a conductive paste 50 such as silver paste or carbon paste, and is maintained at a constant potential. In this manner, antistatic and noise-shielding effects as in the second embodiment can be obtained.

Fifth Embodiment

FIG. 5 shows a method for producing a fingerprint input apparatus of the present embodiment. In contrast to the foregoing first to fourth embodiments applied to a fingerprint input apparatus of sweep type, the present embodiment is applied to a solid image pickup device 1 of two-dimensional array.

At first, on an assembly 1c of plural solid image pickup elements 1 of two-dimensional configuration, a rectangular-shaped silicon sheet 32 is adhered. The adhesion of the silicon sheet 32 is executed while the bonding pads 1b are protected by masking from the deposition of the adhesive material, as explained in the foregoing embodiments. After the adhesive is hardened, the assembly of the solid image pickup device substrates 1 and the silicon sheet 32 are simultaneously cut by dicing into individual units. Obtained effects are similar to those in the first embodiment.

Sixth Embodiment

In the following, an embodiment of a personal authentication system, utilizing the aforementioned fingerprint input apparatus, will be explained with reference to FIGS. 8 and 9.

Figure 8:
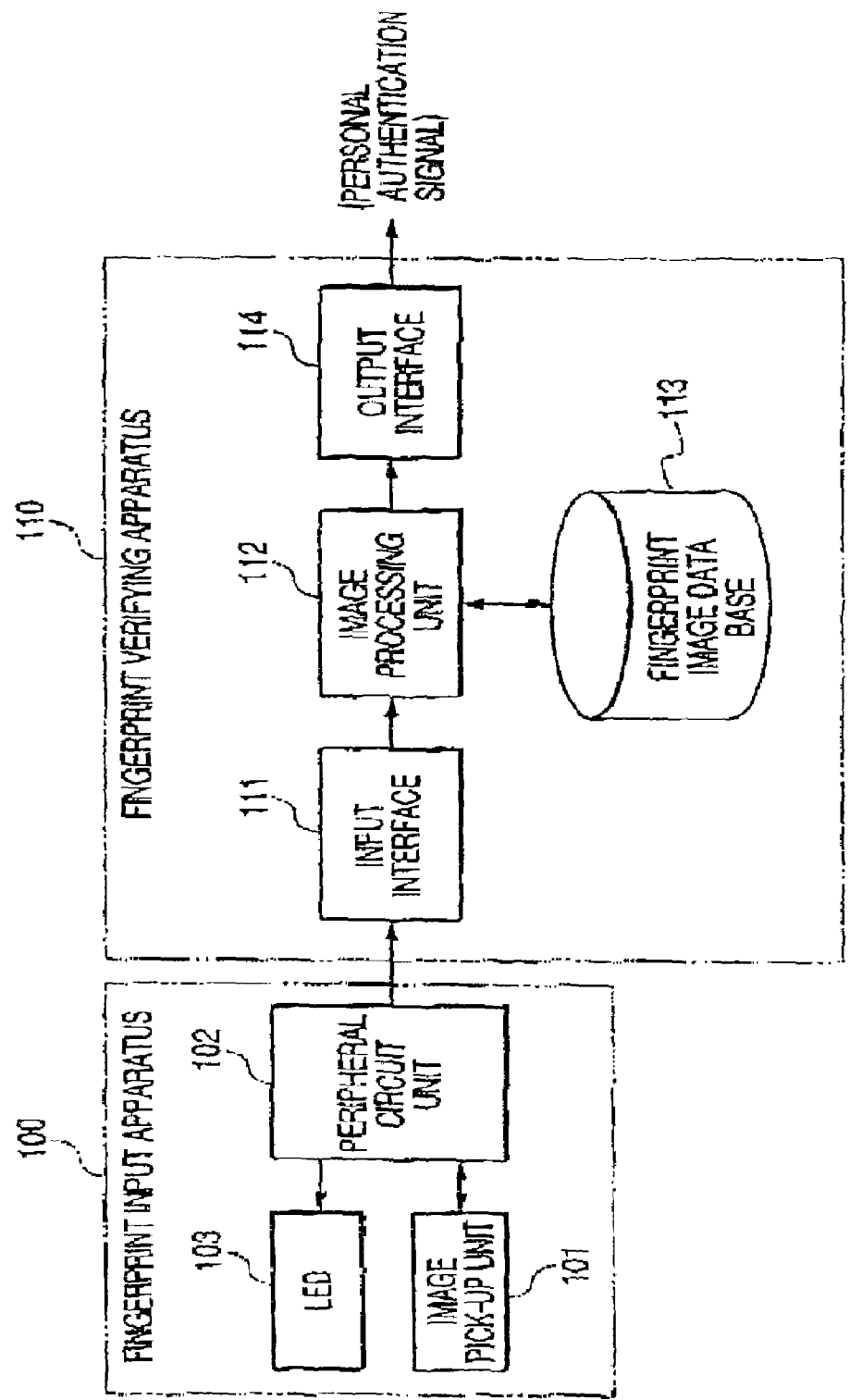
FIG. 8 in a block diagram showing a configuration of a personal authentication system utilizing a fingerprint input apparatus of a sixth embodiment of the present invention.

A personal authentication system shown in FIG. 8 is provided with a fingerprint input apparatus 100 including an image pickup unit 101 constituted of the aforementioned solid image pickup device 1a, a peripheral circuit unit 102, and an LED 103 mounted on the aforementioned LED chip 10, and a fingerprint verification apparatus 110 connected to the fingerprint input apparatus 100.

Figure 9:
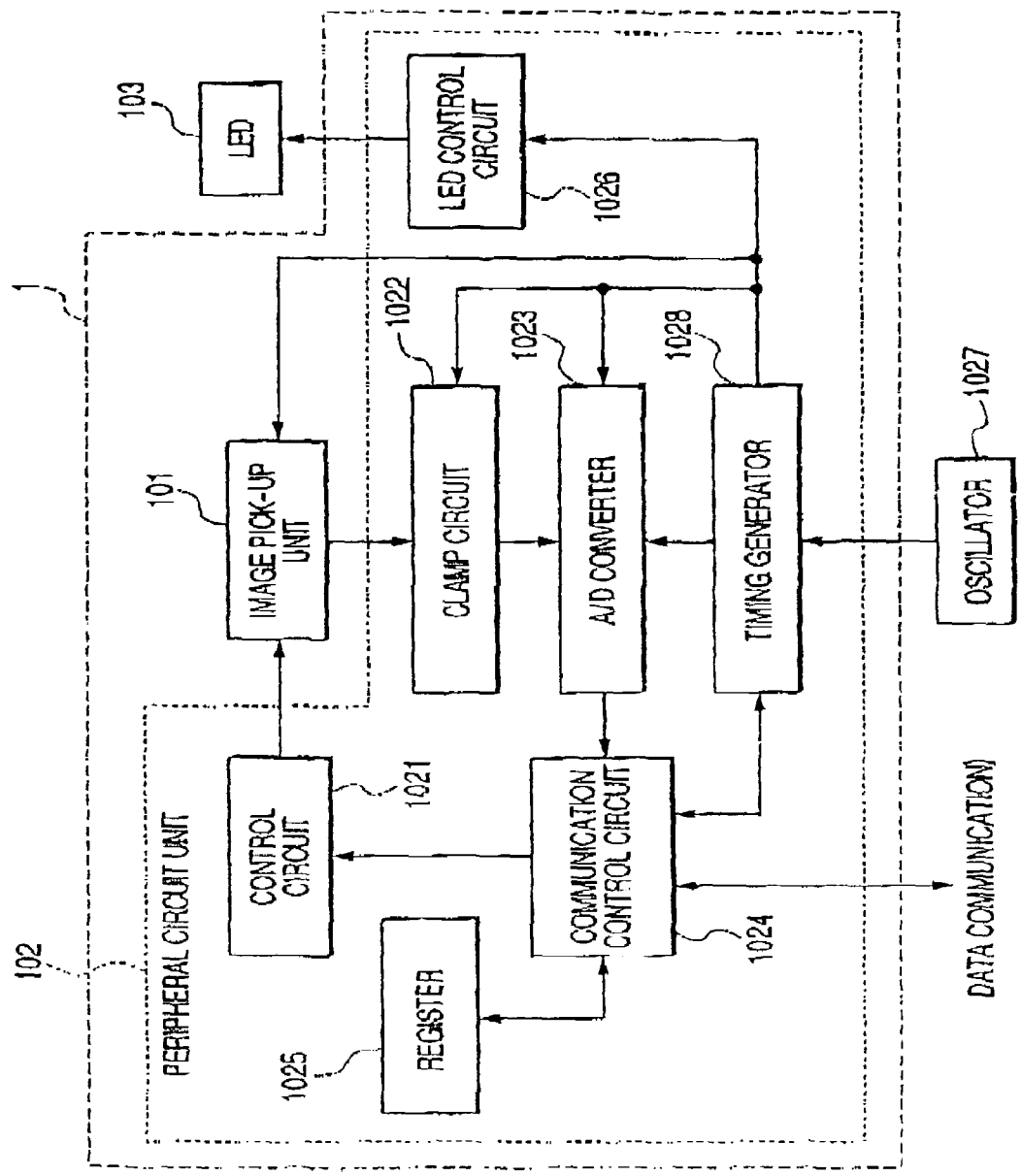
FIG. 9 is a block diagram showing a configuration of a peripheral circuit unit of the fingerprint input apparatus of the sixth embodiment of the present invention.
Figure 10:
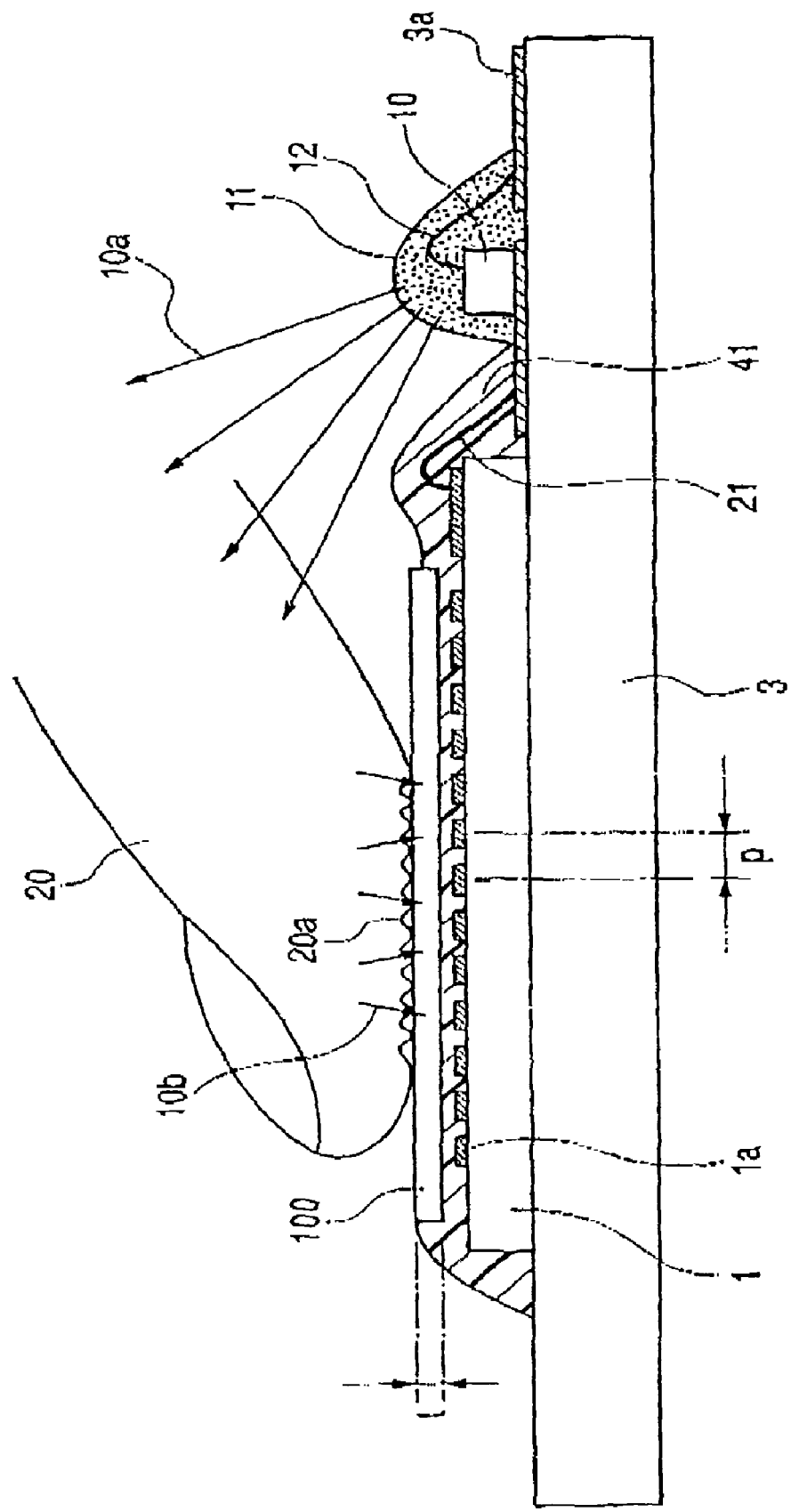
FIG. 10 is a cross-sectional view showing a fingerprint input apparatus of a prior example.

The peripheral circuit unit 102 is formed for example on the solid image pickup substrate 1, and includes, as shown in FIG. 9, a control circuit (drive circuit) 1021 for controlling the function of the solid image pickup device 101, an A/D converter 1023 for converting an analog image signal corresponding to an image, relating to the fingerprint and outputted from the image pickup unit 101, into a digital signal through a clamping circuit 1022, a communication control circuit 1024 for communicating the digital signal, converted by the A/D converter 1023, as a fingerprint image signal to an external apparatus (for example interface), a register 1025 connected the circuit 1024, an LED control circuit 1026 for controlling the LED light emission of the LED 103, and a timing generator 1028 for generating control pulses for controlling the operation timing of the aforementioned circuits 1021-1026, based on a reference pulse supplied from an external oscillator 1027. The circuit including the peripheral circuit unit 102 is not limited to the foregoing and may further include other circuits. On the other hand, a part of the aforementioned circuits may be formed on an unillustrated separate chip.

The fingerprint verification apparatus 110 is provided with an input interface 111 for receiving communication data outputted from the communication control unit of the peripheral circuit unit 102, an image processing unit (fingerprint verifying unit) 112 connected to the input interface 111, a fingerprint image database (fingerprint registration means) 113 connected to the image processing unit 112, and an output interface 114. The output interface is connected to an electronic equipment (including a software), requiring personal authentication for security for the use or for the log-in.

The fingerprint image database 113 registers in advance a fingerprint image of a finger of a subject person to be subjected to personal authentication The subject person can be a single person or plural persons. The fingerprint image of the subject person is entered in advance from the fingerprint input apparatus 100 through the input interface 111, for example at an initialization or at an addition of the subject person.

The image processing unit 112 receives, through the input interface 111, the fingerprint image read by the fingerprint input apparatus 100, verifies whether it matches with the registered image in the fingerprint image database 113 based on an already known algorithm for fingerprint verification, and outputs the result of verification (matching or unmatching of the fingerprint) as a personal authentication signal through the output interface 114.

In the present embodiment, the fingerprint input apparatus 100 and the fingerprint verification apparatus 110 are constructed as separate devices, but the present invention is not limited to such configuration and at least a part of the friction of the fingerprint verification apparatus 110 may be integrally constructed in the peripheral circuit unit 102 of the fingerprint input apparatus 100 if necessary. Also the personal authentication system of the present embodiment nay be integrally incorporated in the electronic equipment requiring the personal authentication or constructed separately therefrom.

What is claimed is:

1. A fingerprint input apparatus comprising:

illumination means for irradiating a finger with a light;

a solid-state image pickup element substrate on which a solid-state image pickup element is formed; and a protective member adhered to a surface of said solid-state image pickup element substrate, at the same side on which the solid-state image pickup element is formed, wherein a fingerprint image of said finger is read while sliding said finger on a surface of said protective member, wherein the solid-state image pickup element substrate and the protective member each have two longitudinal sides extending in a direction perpendicular to a direction of sliding the finger, such that one longitudinal side of the solid-state image pickup element substrate is aligned in the same plane with one longitudinal side of the protective member in a thickness direction of the protective member, while the other longitudinal side of the solid-state image pickup element substrate is aligned in the same plane with the other longitudinal side of the protective member in a thickness direction of the protective member, wherein the illumination means and the solid-state image pickup element substrate are arranged side by side on a wiring substrate along the direction of sliding said finger, and wherein the solid-state image pickup element substrate has a portion of its surface on which the solid-state image pickup element is formed, at least at one end of the solid-state image pickup element substrate in the longitudinal direction, to which the protective member is not adhered, such that the solid-state image pickup element substrate is exposed.

2. A fingerprint input apparatus according to claim 1, wherein said solid-state image pickup element is formed with a rectangular external shape of a predetermined dimension, and a fingerprint image of said finger placed on the surface of said protective member is collectively read through said solid-state image pickup element.

3. A fingerprint input apparatus according to claim 1, wherein said illumination means includes a light source emitting infrared and/or near infrared light.

4. A fingerprint input apparatus according to claim 1, wherein said protective member is a silicon substrate of a predetermined thickness.

5. A fingerprint input apparatus according to claim 1, wherein said protective member includes electroconductive means.

6. A personal authentication system characterized in employing a fingerprint input apparatus according to claim 1.

7. A personal authentication system according to claim 6, further comprising:

fingerprint registration means which registers in advance a fingerprint of said finger, read by said fingerprint input apparatus, as verification information of a person to be verified; and fingerprint verification mans which verifies whether the fingerprint image of said finger, read by said fingerprint input apparatus, matches with the registered image of said fingerprint registration means and outputs a result of the verification as a personal authentication signal.

* * * * *

UNITED STATES PATENT AND TRADEMARK OFFICE
CERTIFICATE OF CORRECTION

PATENT NO. : 7,349,562 B2
APPLICATION NO. : 10/874366
DATED : March 25, 2008
INVENTOR(S) : Makoto Ogura It is certified that error appears in the above-identified patent and that said Letters Patent is hereby corrected as shown below:

Title Pg, Item
(57)    ABSTRACT line 2, ""of" should read --of--.

line 6, "&" should be deleted.

line 18, "external," should read --external--.

Sheet 6, Fig. 9, "DATA" should read --(DATA--.

Col. 1, line 37, "board 3," should read --board 3, which is--.

line 38, Delete "is".

Col. 2, line 10, "is" should read --are--.

line 40, "result" should read --results--; and "and" should be deleted.

Col. 4, line 9, "in" should read --is--.

line 41, "an" should read --as--.

line 42, Delete "a".

line 44, "chip 10" should read --chip 10 is--.

Col. 5, line 32, "side W" should read --side W1--.

Col. 6, line 15, "provides" should read --provides the--.

Figure 7:
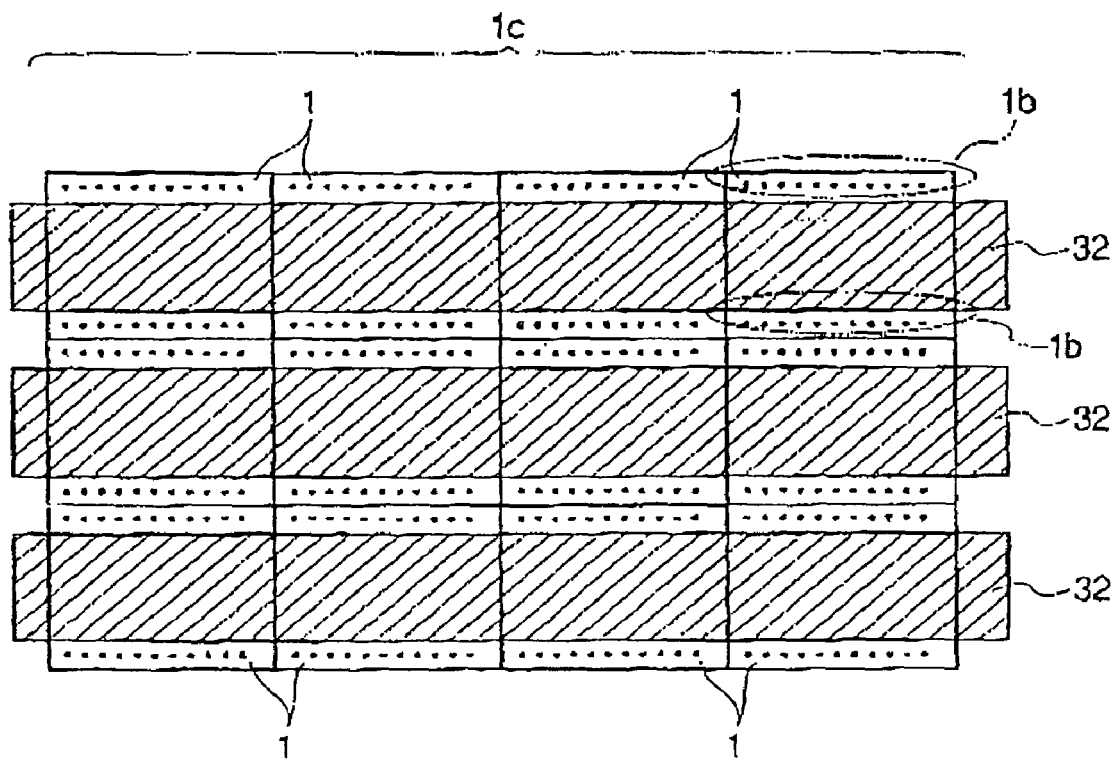
FIG. 7 is a schematic view showing a producing method for a fingerprint input apparatus in a fifth embodiment of the present invention.

Col. 7, line 12, "end" should read --and--.

line 16, "respectively" should read --respectively to--.

line 52, "FIG. 5" should read --FIG. 7--.

UNITED STATES PATENT AND TRADEMARK OFFICE
CERTIFICATE OF CORRECTION

PATENT NO.        : 7,349,562 B2
APPLICATION NO.   : 10/874366
DATED             : March 25, 2008
INVENTOR(S)       : Makoto Ogura It is certified that error appears in the above-identified patent and that said Letters Patent is hereby corrected as shown below:

Col. 8, line 65, "friction" should read --functions--.

Col. 9, line 2, "nay" should read --may--.

Signed and Sealed this

Sixteenth Day of September, 2008

JON W. DUDAS
*Director of the United States Patent and Trademark Office*